US009597971B2

United States Patent
Briz et al.

(10) Patent No.: US 9,597,971 B2
(45) Date of Patent: Mar. 21, 2017

(54) METHODS AND SYSTEMS FOR COMPATIBLE OPERATION BETWEEN A WIRELESS POWER TRANSFER SYSTEM AND VEHICLE REMOTE ENTRY SYSTEMS

(71) Applicant: QUALCOMM Incorporated, San Diego, CA (US)

(72) Inventors: Alberto Garcia Briz, Munich (DE); Edward Leonardus Van Boheemen, Munich (DE); Grzegorz Krzysztof Ombach, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 14/488,006

(22) Filed: Sep. 16, 2014

(65) Prior Publication Data
US 2016/0075239 A1     Mar. 17, 2016

(51) Int. Cl.
*H02J 7/00* (2006.01)
*H02J 7/14* (2006.01)
(Continued)

(52) U.S. Cl.
CPC .............. *B60L 11/182* (2013.01); *H02J 5/005* (2013.01); *H02J 7/025* (2013.01); *H02J 7/04* (2013.01);
(Continued)

(58) Field of Classification Search
USPC ....... 320/108, 109, 137, 104, 106, 162, 103, 320/107, 111, 116, 124; 307/104, 10.1,
(Continued)

(56) References Cited

U.S. PATENT DOCUMENTS

| | | | |
|---|---|---|---|
| 2009/0085522 A1* | 4/2009 | Matsumoto ........... | B60L 11/182 320/137 |
| 2010/0063675 A1* | 3/2010 | Soma ................... | B60L 11/123 701/36 |

(Continued)

FOREIGN PATENT DOCUMENTS

| | | |
|---|---|---|
| DE | 102013016887 A1 | 6/2014 |
| JP | 2010093957 A | 4/2010 |

(Continued)

OTHER PUBLICATIONS

International Search Report and Written Opinion—PCT/US2015/045914—ISA/EPO—Nov. 26, 2015.

*Primary Examiner* — Alexis A Boateng
(74) *Attorney, Agent, or Firm* — Knobbe Martens Olson & Bear LLP

(57) ABSTRACT

Methods and apparatuses for transmitting charging power wirelessly are provided. One implementation includes an apparatus for transmitting charging power wirelessly to a vehicle. The apparatus comprises a transmit circuit configured to transfer wireless charging power to the vehicle via a wireless field. The apparatus comprises a controller configured to detect transmission of a wireless vehicle signal having a transmission period and indicative of operation of a vehicle communication system. The controller is configured to cause the transmit circuit to reduce a level of charging power within a first portion of the transmission period. A second, remaining portion of the transmission period is of sufficient duration for allowing identification of the wireless vehicle signal by a receiver of the wireless vehicle signal. The wireless vehicle signal comprises a plurality of pulses. At least one pulse is transmitted within the first portion. The remaining pulses are transmitted within the second, remaining portion.

30 Claims, 8 Drawing Sheets

(51) Int. Cl.
  *B60L 11/18*   (2006.01)
  *H02J 7/02*    (2016.01)
  *H02J 7/04*    (2006.01)
  *H02J 5/00*    (2016.01)
  *H04B 5/00*    (2006.01)

(52) U.S. Cl.
  CPC ......... *H04B 5/0031* (2013.01); *H04B 5/0037* (2013.01); *Y02T 90/169* (2013.01); *Y04S 30/14* (2013.01)

(58) Field of Classification Search
  USPC .......................................................... 307/9.1
  See application file for complete search history.

(56) References Cited

U.S. PATENT DOCUMENTS

| | | | |
|---|---|---|---|
| 2010/0117596 A1* | 5/2010 | Cook | B60L 11/182 320/108 |
| 2010/0225271 A1* | 9/2010 | Oyobe | B60L 5/005 320/108 |
| 2012/0153894 A1 | 6/2012 | Widmer | |
| 2012/0280574 A1 | 11/2012 | Hur et al. | |
| 2012/0299538 A1 | 11/2012 | Arai et al. | |
| 2013/0300204 A1* | 11/2013 | Partovi | H01F 38/14 307/104 |
| 2014/0009261 A1 | 1/2014 | Iwanaga | |
| 2014/0012448 A1* | 1/2014 | Tripathi | G05D 1/0276 701/22 |
| 2014/0028244 A1* | 1/2014 | Korekoda | B60L 11/1812 320/106 |
| 2014/0035526 A1* | 2/2014 | Tripathi | B60L 11/1838 320/109 |
| 2014/0103865 A1 | 4/2014 | Van et al. | |
| 2014/0183967 A1* | 7/2014 | Ryu | B60L 11/182 307/104 |
| 2015/0042168 A1* | 2/2015 | Widmer | B60L 11/182 307/104 |

FOREIGN PATENT DOCUMENTS

| | | |
|---|---|---|
| JP | 2012161235 A | 8/2012 |
| JP | 2014116999 A | 6/2014 |
| WO | WO-2012082858 A1 | 6/2012 |
| WO | WO-2013059919 A1 | 5/2013 |
| WO | WO-2013103943 A1 | 7/2013 |
| WO | WO-2013121723 A2 | 8/2013 |

* cited by examiner

METHODS AND SYSTEMS FOR COMPATIBLE OPERATION BETWEEN A WIRELESS POWER TRANSFER SYSTEM AND VEHICLE REMOTE ENTRY SYSTEMS

TECHNICAL FIELD

This disclosure generally relates to wireless power transfer. More specifically, the disclosure is directed to devices, systems, and methods related to providing compatible operation between wireless power transfer systems and vehicle remote keyless entry systems.

BACKGROUND

Remote keyless entry systems provide convenient functionality to users of vehicles, including hands-free locking and unlocking of doors, theft protection and keyless starting of the engine. Such remote keyless entry systems rely at least in part on receiving and processing a signal from a handheld key fob in proximity to the enabled vehicle. When active in proximity to such vehicles, wireless power transfer systems may produce powerful wireless fields that may affect performance of (e.g., saturate) receive antennas in either or both of the vehicle remote keyless entry system and the handheld key fob. This may compromise the ability of either or both of the vehicle remote keyless entry system and the handheld key fob to receive and process the signals required for proper operation. Thus, there is a need to control the operation of such wireless power transfer systems during periods of remote keyless entry system use.

SUMMARY

An apparatus for transmitting charging power wirelessly to a vehicle is provided. The apparatus comprises a transmit circuit configured to transfer wireless charging power to the vehicle via a wireless field. The apparatus comprises a controller configured to detect transmission of a wireless vehicle signal having a transmission period and indicative of operation of a vehicle communication system. The controller is further configured to cause the transmit circuit to reduce a level of charging power within a first portion of the transmission period. A second, remaining portion of the transmission period is of sufficient duration for allowing identification of the wireless vehicle signal by a receiver of the wireless vehicle signal.

A method for transmitting charging power wirelessly from a transmit circuit to a vehicle is provided. The method comprises transferring a level of charging power to the vehicle via a wireless field. The method comprises detecting transmission of a wireless vehicle signal having a transmission period and indicative of operation of a vehicle communication system. The method comprises reducing the level of charging power within a first portion of the transmission period. A second, remaining portion of the transmission period is of sufficient duration for allowing identification of the wireless vehicle signal by a receiver of the wireless vehicle signal.

A non-transitory computer-readable medium comprising code is provided. The code, when executed, causes an apparatus for transmitting charging power wirelessly to transfer a level of charging power to a vehicle via a wireless field. The code, when executed, causes the apparatus to detect transmission of a wireless vehicle signal having a transmission period and indicative of operation of a vehicle communication system. The code, when executed, causes the apparatus to reduce the level of charging power within a first portion of the transmission period. A second, remaining portion of the transmission period is of sufficient duration for allowing identification of the wireless vehicle signal by a receiver of the wireless vehicle signal.

An apparatus for transmitting charging power wirelessly to a vehicle is provided. The apparatus comprises means for transferring wireless charging power to the vehicle via a wireless field. The apparatus comprises means for detecting transmission of a wireless vehicle signal having a transmission period and indicative of operation of a vehicle communication system. The apparatus comprises means for reducing a level of charging power within a first portion of the transmission period. A second, remaining portion of the transmission period is of sufficient duration for allowing identification of the wireless vehicle signal by a receiver of the wireless vehicle signal.

Figure 1:
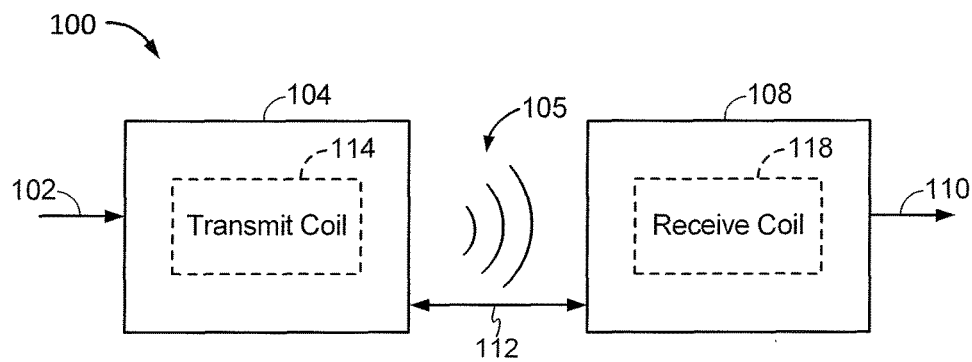
FIG. 1 is a functional block diagram of a wireless power transfer system, in accordance with an exemplary implementation.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of certain implementations of the application and is not intended to represent the only implementations that may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the disclosed implementations. In some instances, some devices are shown in block diagram form.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive coil" to achieve power transfer.

FIG. 1 is a functional block diagram of a wireless power transfer system 100, in accordance with an exemplary implementation. An input power 102 may be provided to a transmit coil 114 (e.g., a transmit antenna circuit 114) of a transmitter 104 from a power source (not shown) to generate a wireless (e.g., magnetic or electromagnetic) field 105 for performing energy or power transfer. A receive coil 118 (e.g., a receive antenna circuit 118) of a receiver 108 may couple to the wireless field 105 and may generate an output power 110 for storing or consumption by a device (not shown) coupled to the output power 110. Both the transmitter 104 and the receiver 108 may be separated by a distance 112.

In one exemplary implementation, the transmit coil 114 and the receive coil 118 are configured according to a mutual resonant relationship. When the resonant frequency of the receive coil 118 and the resonant frequency of the transmit coil 114 are substantially the same, or very close, transmission losses between the transmitter 104 and the receiver 108 are minimal. As such, wireless power transfer may be provided over a larger distance in contrast to purely inductive solutions that may require large coils placed very close to one another (e.g., sometimes within millimeters). Resonant inductive coupling techniques may thus allow for improved efficiency and power transfer over various distances and with a variety of inductive coil configurations.

The receiver 108 may receive power when the receive coil 118 is located in the wireless field 105 produced by the transmit coil 114. The wireless field 105 corresponds to a region where energy output by the transmit coil 114 may be captured by the receive coil 118. The wireless field 105 may correspond to the "near-field" of the transmitter 104. The "near-field" may correspond to a region in which there are strong reactive fields resulting from the currents and charges in the transmit coil 114 that minimally radiate power away from the transmit coil 114, rather than radiating electromagnetic energy away into free space. The "near-field" may correspond to a region that is within about one wavelength (or a fraction thereof) of the transmit coil 114.

As described above, efficient energy transfer may occur by coupling a large portion of the energy in the wireless field 105 to the receive coil 118 rather than propagating most of the energy in an electromagnetic wave to the far field. When positioned within the wireless field 105, a "coupling mode" may be developed between the transmit coil 114 and the receive coil 118. The area around the transmit coil 114 and the receive coil 118 where this coupling may occur is referred to herein as a coupling-mode region.

Figure 2:
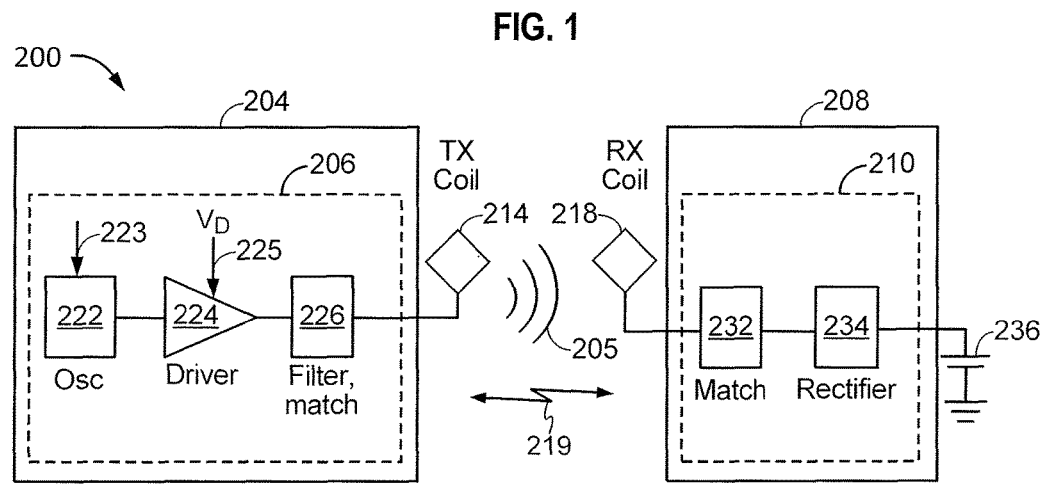
FIG. 2 is a functional block diagram of a wireless power transfer system, in accordance with another exemplary implementation.

FIG. 2 is a functional block diagram of a wireless power transfer system 200, in accordance with another exemplary implementation. The system 200 includes a transmitter 204 and a receiver 208. The transmitter 204 may include a transmit circuit 206 that may include an oscillator 222, a driver circuit 224, and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit coil 214 at, for example, a resonant frequency of the transmit coil 214 based on an input voltage signal ($V_D$) 225. The filter and matching circuit 226 may filter out harmonics or other unwanted frequencies and may also match the impedance of the transmitter 204 to the impedance of the transmit coil 214 for maximal power transfer. The driver circuit 224 may drive a current through the transmit coil 214 to generate a wireless field 205 for wirelessly outputting power at a level sufficient for charging a battery 236 of an electric vehicle, for example.

The receiver 208 may include a receive circuit 210 that may include a matching circuit 232 and a rectifier circuit 234. The matching circuit 232 may match the impedance of the receive circuit 210 to the receive coil 218. The rectifier circuit 234 may generate a direct current (DC) power output from an alternating current (AC) power input to charge the battery 236, as shown in FIG. 2. The receiver 208 and the transmitter 204 may additionally communicate on a separate communication channel 219 (e.g., Bluetooth, Zigbee, cellular, etc). The receiver 208 and the transmitter 204 may alternatively communicate via band signaling using characteristics of the wireless field 205. The receiver 208 may be configured to determine whether an amount of power transmitted by the transmitter 204 and received by the receiver 208 is appropriate for charging the battery 236.

Figure 3:
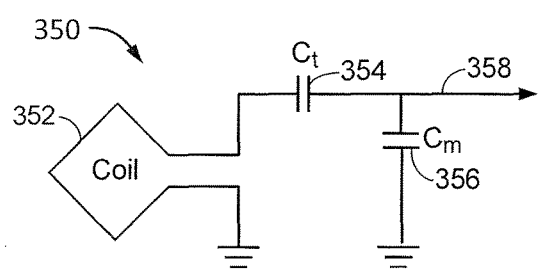
FIG. 3 is a schematic diagram of a portion of the transmit circuit or the receive circuit of FIG. 2 including a transmit coil or a receive coil, in accordance with an exemplary implementation.

FIG. 3 is a schematic diagram of a portion of the transmit circuit 206 or the receive circuit 210 of FIG. 2 including a transmit coil or a receive coil, in accordance with an exemplary implementation. As illustrated in FIG. 3, a transmit or receive circuit 350 may include a coil 352. The coil 352 may also be referred to as a "loop" antenna, a "magnetic" coil or an induction coil 352. The term "coil" generally refers to a component that may wirelessly output or receive energy for coupling to another "coil." As used herein, the coil 352 is an example of a "power transfer component" of a type that is configured to wirelessly output and/or receive power. The coil 352 may include an air core or a physical core such as a ferrite core (not shown).

The resonant frequency of a coil is based on the inductance and capacitance of the coil. Inductance may be simply the inductance created by the coil 352, whereas, capacitance may be added to the coil's inductance to create a resonant structure at a desired resonant frequency. As a non-limiting example, a capacitor 354 and a capacitor 356 may be added to the transmit or receive circuit 350 to create a resonant circuit that selects a signal 358 at a resonant frequency. Accordingly, for larger diameter coils, the size of capacitance needed to sustain resonance may decrease as the diameter or inductance of the coil increases.

Furthermore, as the diameter of the coil increases, the efficient energy transfer area of the near-field may also increase. Other resonant circuits formed using other components are also possible. As another non-limiting example, a capacitor may be placed in parallel between the two terminals of the circuit 350. For transmit coils, the signal 358, with a frequency that substantially corresponds to the resonant frequency of the coil 352, may be an input to rather than an output from the coil 352.

Figure 4:
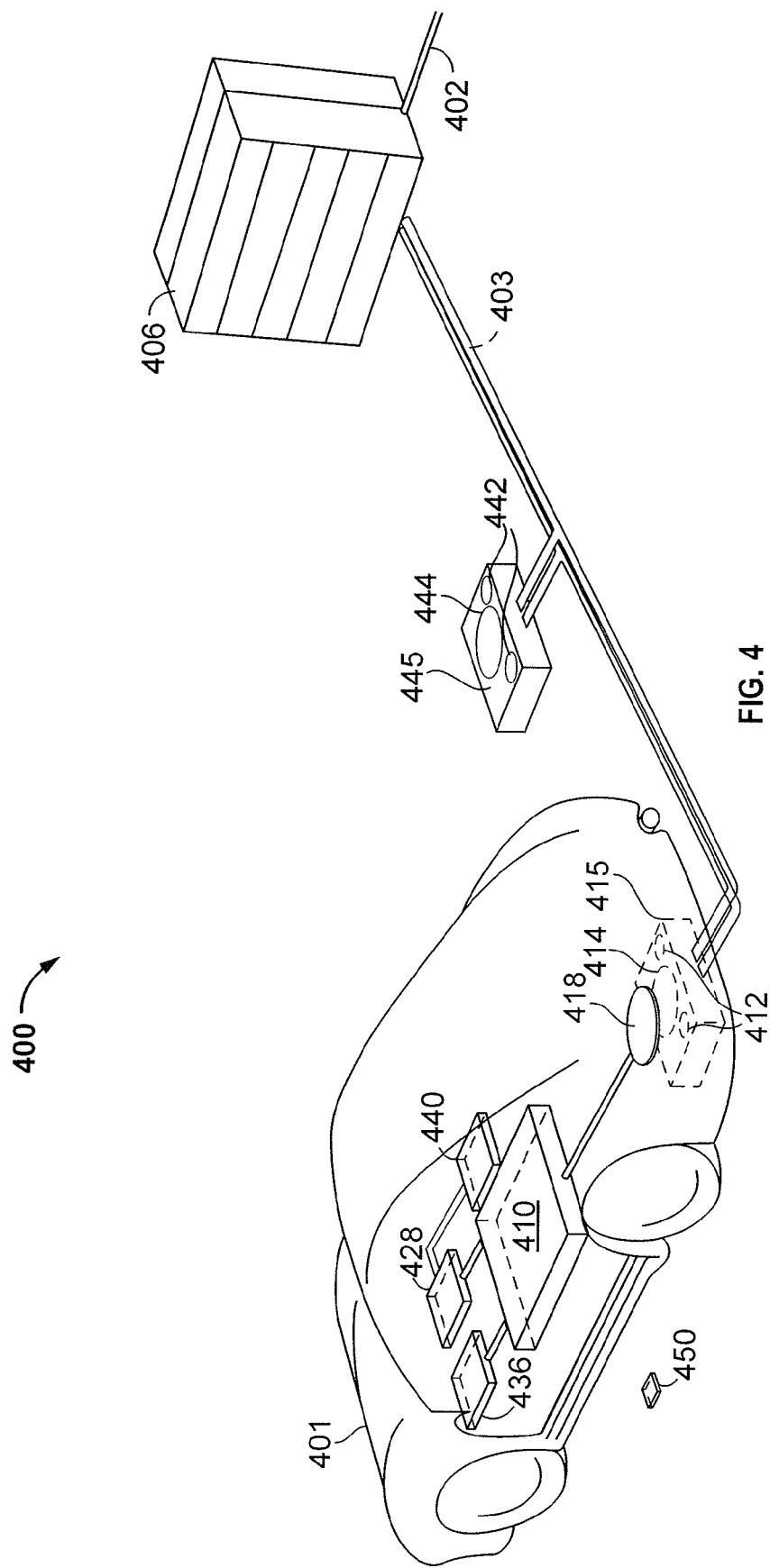
FIG. 4 is a perspective-view diagram of a vehicle aligned over a wireless power transmit unit, in accordance with an exemplary implementation.
Figure 5:
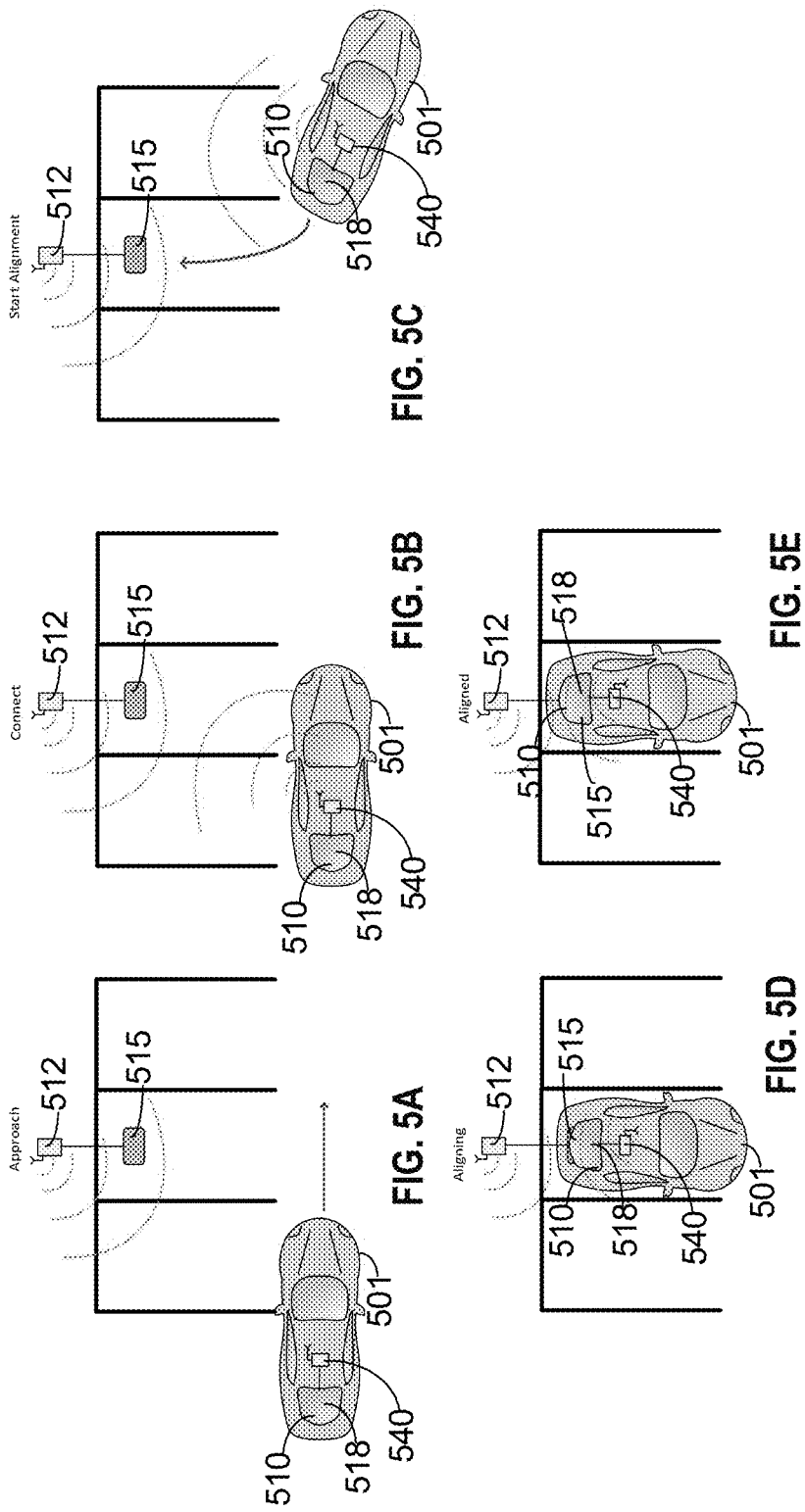
FIGS. 5A, 5B, 5C, 5D and 5E are depictions of an alignment operation between an electric vehicle and a wireless power transmit unit, in accordance with an exemplary implementation.

FIG. 4 is a perspective-view diagram of a vehicle 401 aligned over a wireless power transmit unit (PTU) 415, in accordance with an exemplary implementation. Upon arriving at a parking spot, a driver of the vehicle 401 may align the vehicle 401 with the PTU 415 for subsequent vehicle charging, as will be described in more detail in connection with FIG. 5 below. Once the driver parks the vehicle 401, a wireless power transfer system 400 may enable charging of the vehicle 401 while the vehicle 401 is aligned over the wireless PTU 415. In some implementations, the wireless power transfer system 400 may comprise a transmit circuit 406 connected to a power backbone 402. The transmit circuit 406 may provide an alternating current (AC) via an electrical connection 403 to one or more wireless PTUs, for example the wireless PTU 415 and an adjacent wireless PTU 445. Although only two PTUs are illustrated, the wireless power transfer system 400 is not so limited and may comprise any number of wireless PTUs. Thus, the wireless power transfer system 400 may provide simultaneous wireless charging for multiple vehicles.

The wireless PTU 415 may comprise a transmit coil 414 configured to receive the AC current from the transmit circuit 406. The wireless PTU 415 may additionally comprise at least one PTU remote keyless entry (RKE) circuit 412 (e.g., two are shown in FIG. 4) including at least one antenna and having functionality for controlling operation of the PTU 415 and the adjacent PTU 445, as will be described in more detail in connection with FIGS. 6 and 7 below. Likewise, the adjacent wireless PTU 445 may comprise at least one PTU RKE circuit 442 including at least one antenna and a transmit coil 444 configured to receive the AC current from the transmit circuit 406. Where a plurality of PTU RKE circuits 412/442 are utilized, each of the plurality of PTU RKE circuits 412/445 may be disposed in specific locations on or in the respective PTU 415/445 to reduce the impact of a wireless field generated in the PTU 415/445 on the respective antennas of the PTU RKE circuits 412/442. Moreover, the antennas of the RKE circuits 412 may comprise single axis or dual-axis antennas for resolving the transmission location of a received signal. In some implementations, one or more turns or loops of the antennas of the RKE circuits 412 may have an increased size as compared to loops of similar antennas in a vehicle RKE circuit 440 or an associated RKE key fob 450. In some implementations, an electronic gain associated with the antennas of the RKE circuits 412 may be increased as compared to similar antennas in the vehicle RKE circuit 440 or the associated RKE key fob 450. In at least some implementations, the at least one PTU RKE circuits 412/442 may be operational while one or more of the wireless PTUs 415 and 445 are generating a wireless field. Accordingly, it is desirable that the PTU RKE circuits 412/442 include filtering circuitry (not shown) to block frequencies at or near the frequency of operation of the PTUs 415/445 (e.g., 80-90 kHz).

The vehicle 401 may include a receive circuit 410 connected to a receive coil 418. The receive coil 418 may receive power when located in a wireless field, as previously described in connection with FIGS. 1 and 2, produced by the transmit coil 414 of the PTU 415. The vehicle 401 may additionally include a battery 436. The battery 436 may store power received from the receive circuit 410 for later use by the vehicle 401. The vehicle additionally includes a controller circuit 428 connected to at least the receive circuit 410 and a vehicle RKE circuit 440 comprising at least one antenna (not shown). The controller circuit 428 controls the operation of at least the receive circuit 410. The vehicle RKE circuit 440 provides RKE functionality for the vehicle 401, such as unlocking doors and/or other useful features, when an associated RKE key fob 450 having an antenna (not shown) is detected within a certain distance (e.g., 1-2 meters) of the vehicle 401. The vehicle RKE circuit 440 may communicate with the RKE key fob 450 and the at least one PTU RKE circuit 412 via low frequency (LF)/radio frequency (RF) communication links. For example, when the driver grasps a door handle of the vehicle 401 the vehicle RKE circuit 440 may transmit a LF signal (e.g., a 21 kHz, 121 kHz, 125 kHz, or 135 kHz signal). This LF signal may be utilized to initiate detection and authentication of the paired RKE key fob 450. In response, the RKE key fob 450 may transmit an RF signal (e.g., a 315 MHz, 433 MHz or 866 MHz signal) including identifying information back to the vehicle RKE circuit 440. If the identifying information matches authentication information stored in or otherwise provided to the vehicle RKE circuit 440, the vehicle RKE circuit 440 may unlock the respective doors or perform the appropriate RKE functionality.

Proper operation of the vehicle RKE circuit 440 and/or the paired RKE key fob 450 may be compromised when either the transmit coil 414 or the transmit coil 444 are generating a wireless field (not shown). For example, the high magnetic fields present in the wireless field may saturate the antenna(s) of the vehicle RKE circuit 440 as well as the antenna of the RKE key fob 450. Accordingly, the vehicle RKE circuit 440 may not detect or authenticate the RKE key fob 450 while either of the transmit coil 414 and the transmit coil 444 are active. Likewise, the RKE key fob 450 may not detect the LF signal transmitted by the vehicle RKE circuit 440 while either of the transmit coil 414 and the transmit coil 444 are active. For this reason, the at least one PTU RKE circuit 412 may direct the transmit circuit 406 to shut off the supply of AC power to the transmit coil 414, and in some cases, to the transmit coil 444 upon detection of the LF signal transmitted by the vehicle RKE circuit 440. Such operation will be described in more detail in connection with FIGS. 6 and 7 below. In some other implementations, it is contemplated that the RKE functionality as previously described, and as will be further described below, may be substituted by any vehicle communication system that transmits wireless signals.

FIGS. 5A, 5B, 5C, 5D and 5E are depictions of an alignment operation between an electric vehicle 501 and a wireless power transmit unit 515, in accordance with an exemplary implementation. Numerated features in each of FIGS. 5A-5E may correspond to similarly numerated features (e.g., receive coil 518 corresponds to receive coil 418) as previously discussed in connection with FIG. 4. Moreover, only those features necessary for the following discussion are illustrated in FIGS. 5A-5E, though additional features may be present. As shown in FIG. 5A, an electric vehicle 501 may approach a PTU 515 comprising at least one PTU RKE circuit 512 having an antenna. Although only one PTU RKE circuit 512 is illustrated as located separately from the PTU 515, a plurality of PTU RKE circuits 512 each having an antenna may be located in a housing of the PTU 515, as illustrated in FIG. 4. The vehicle 501 may include a receive circuit 510 electrically connected to a receive coil 518. The vehicle 501 additionally includes a vehicle RKE circuit 540.

In FIG. 5B, the RKE circuit 540 onboard the vehicle 501 may transmit the LF RKE signal, as previously described in connection with FIG. 4. In some other implementations, another wireless vehicle communication system (see communication circuit 629 of FIG. 6) may transmit a signal (e.g., a Bluetooth signal or a WiFi signal) as, or in place of, the LF RKE signal. In such implementations, the Bluetooth or WiFi signal may be associated with a pairing operation between the vehicle 501 and the PTU RKE circuit 512 that may be initiated as the vehicle 501 enters a vicinity of the PTU 515. The RKE circuit 540 transmitting the LF RKE signal (or the communication circuit 629 transmitting the Bluetooth or WiFi signal) may initiate a guidance and alignment process for the vehicle 501. In response to receiving the LF RKE signal (or the Bluetooth/WiFi signal), the PTU RKE circuit 512 in the PTU 515 may respond by transmitting the RF RKE signal, as previously described in connection with FIG. 4. Since the PTU RKE circuit 512 may be continuously powered, power efficiency or conservation considerations imposed on RKE key fobs may not apply. Accordingly, the PTU RKE circuit 512 may provide an increased range of RKE detection (e.g., 4-5 m) as compared to conventional RKE key fobs (e.g., 1-2 m). Although only one PTU 515 is illustrated in FIGS. 5A-5E, more than one PTU 515 may be present in a parking lot or parking structure. In such a case, a respective PTU RKE circuit 512 associated with each of a multiple of PTUs 515 may respond to the LF RKE signal (or the Bluetooth/WiFi signal) by transmitting the RF RKE signal. Since the RF RKE signal is typically encrypted for the particular RKE system to which it is paired, the respective PTU RKE circuit 512 may transmit the RF RKE signal including an ID unique to the associated PTU 515 or unique to a particular type of wireless power transfer system. Of course, an occupied PTU of the multiple PTUs may not respond to the LF RKE signal. To aid in differentiation between responses from different PTUs 515, the PTU RKE circuits 512 of the multiple PTUs 515 may transmit the respective RF RKE signals at different times from one another. In some implementations, the driver of the vehicle 501 may utilize a user interface (see FIG. 6) to select one of the multiple available PTUs 515 for charging, as will be described in more detail in connection with FIG. 10 below.

Once the PTU 515 is selected and where the LF RKE signal was transmitted by the RKE circuit 540, the PTU RKE circuit 512 may utilize the LF RKE signal to triangulate the position of the vehicle 501 relative to the PTU 515. In some implementations, utilizing multiple PTU RKE circuits 512 in the PTU 515 may provide more accurate location of the vehicle position and may allow the use of only a single antenna in the vehicle RKE circuit 540. The PTU RKE circuits 512 may then transmit an indication of the calculated vehicle position back to the vehicle RKE circuit 540 in the RF RKE signal, as previously described in connection with FIG. 4. In some implementations, one or more other vehicle systems (e.g., a global positioning system) may have already determined the position of the vehicle. In such implementations, the one or more other vehicle systems may forward the determined position of the vehicle to the PTU RKE circuits 512. The PTU RKE circuits 512 may then transmit the indication of the calculated vehicle position back to the vehicle RKE circuit 540.

In an alternative implementation where the communication circuit 629 transmits the Bluetooth/WiFi signal, the vehicle RKE circuit 540 may utilize the RK RKE signal to calculate the position of the PTU 515 relative to the vehicle 501.

In FIG. 5C, a driver of the vehicle 501 may maneuver the vehicle 501 towards the PTU 515. During alignment where the PTU RKE circuit 512 calculates the position of the vehicle 501, the RKE circuit 540 may periodically transmit the LF signal to the RKE circuits 512. The RKE circuits 512 may periodically transmit the indication of the position of the vehicle 501 back to the RKE circuit 540 via the RF RKE signal. The driver of the vehicle 501 may use the vehicle position, as may be displayed on the user interface within the vehicle 501 (see FIG. 6), to determine when the vehicle 501 is properly positioned for wireless power transfer. During alignment where the RKE circuit 540 calculates the position of the PTU 512, the RKE circuit 512 may periodically transmit the RF RKE signal to the RKE circuit 540. The RKE circuit 540 may periodically calculate the position of the PTU 512 relative to the vehicle 501. The driver of the vehicle 501 may use the PTU position, as may be displayed on the user interface within the vehicle 501 (see FIG. 6), to determine when the vehicle 501 is properly positioned for wireless power transfer.

In FIG. 5D, the alignment procedure continues as the driver of the vehicle 501 finalizes alignment by positioning the vehicle 501 such that the receive coil 518 mounted to the vehicle 510 is substantially aligned with the PTU 515. FIG. 5E shows the vehicle 501 parked such that the receive coil 518 is substantially aligned with the PTU 515.

Figure 6:
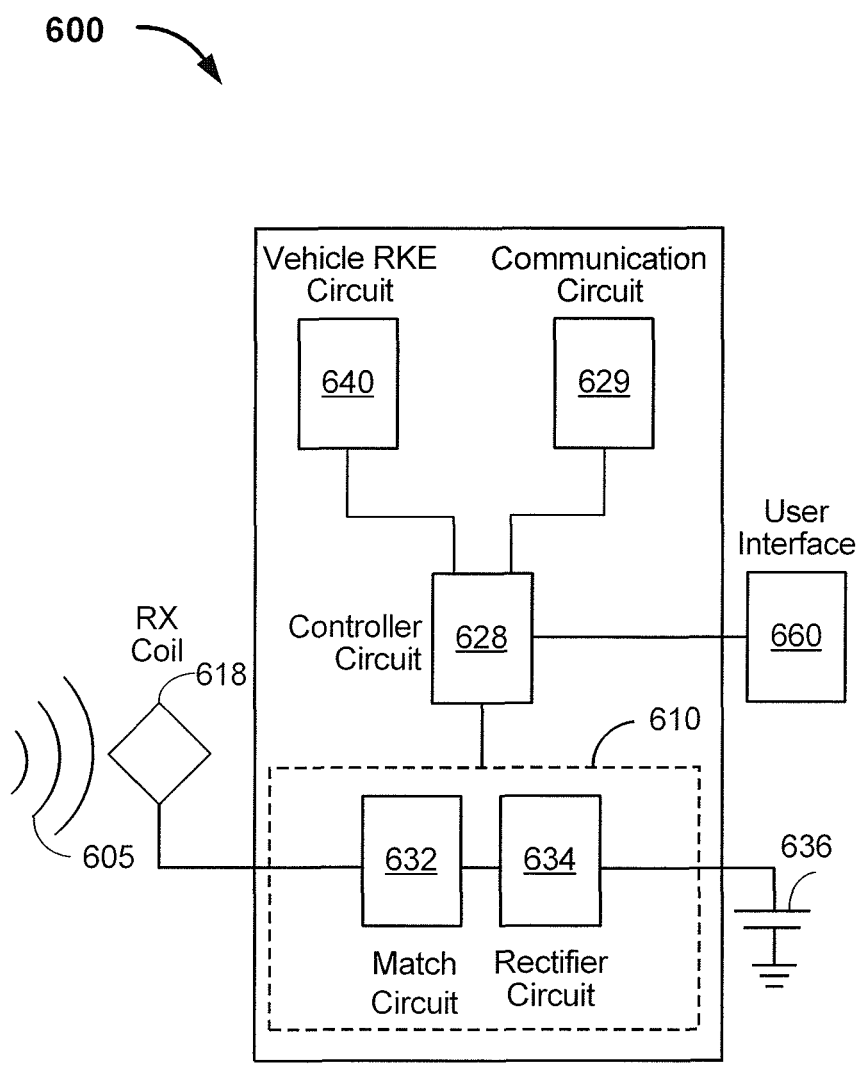
FIG. 6 is a functional block diagram of a wireless power receiver system, in accordance with an exemplary implementation.
Figure 7:
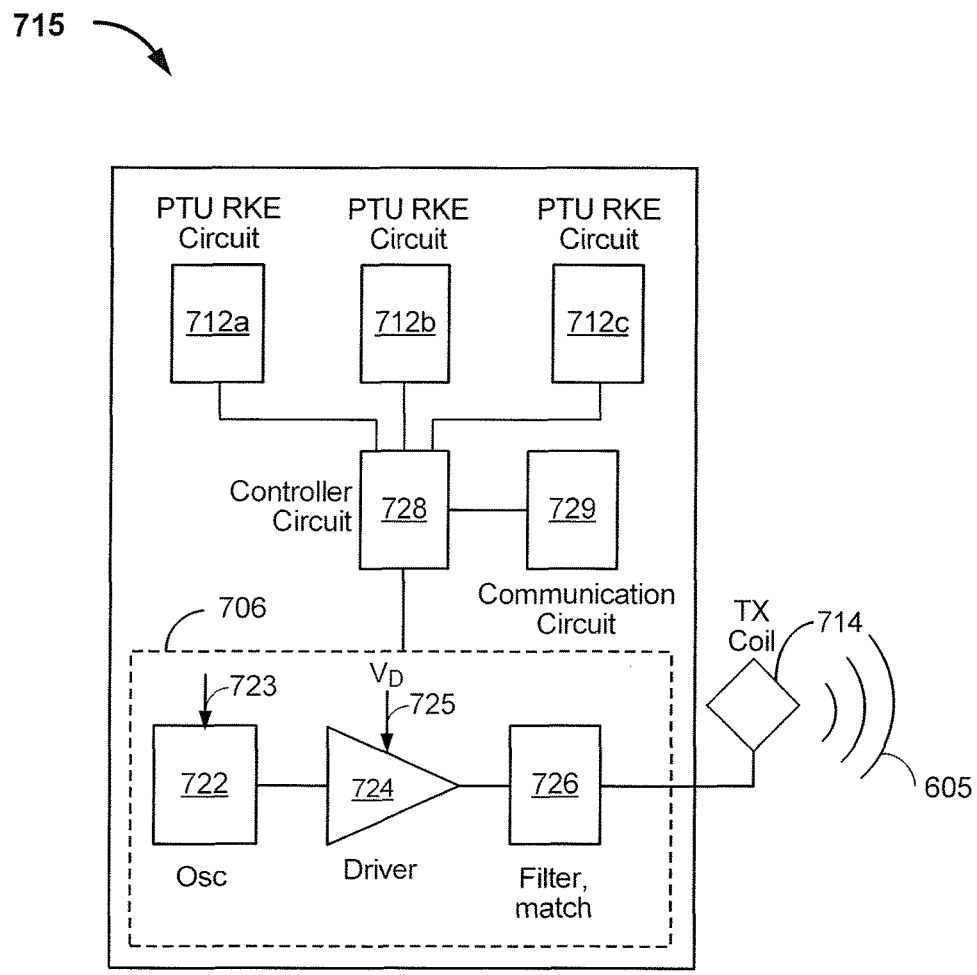
FIG. 7 is a functional block diagram of a wireless power transmit unit, in accordance with an exemplary implementation.

FIG. 6 is a functional block diagram of a wireless power receiver system 600, in accordance with an exemplary implementation. FIGS. 6 and 7 describe the interaction between a vehicle RKE circuit 640 and one or more PTU RKE circuits 712a-712c (see FIG. 7) for controlling wireless power transfer. As shown in FIG. 6, the receiver system 600 may be mounted in a chargeable vehicle (e.g., the vehicle 401/501 of FIGS. 4 and 5A-5E, respectively) and may comprise a receive coil 618 electrically connected to a receive circuit 610, which may correspond to the receive coils 218/418 and the receive circuits 210/410 of FIGS. 2 and 4, respectively. The receive circuit 610 may include a match circuit 632 electrically connected to a rectifier circuit 634. The receive coil 618 may be electrically connected to the match circuit 632. The rectifier circuit 634 may provide a DC current to a battery 636. Unless stated otherwise, each component within the receive circuit 610 may correspond to and have substantially the same functionality as the respective component within the receive circuit 210, as previously described in connection with FIG. 2. To provide power to the receive circuit 610, energy may be transmitted from a transmit coil 714 (described in more detail in connection with FIG. 7 below) to the receive coil 618 through a wireless field 605.

The receiver system 600 may further include a controller circuit 628 electrically connected to each of a communication circuit 629, a user interface 660, the receive circuit 610 and to least one vehicle RKE circuit 640 comprising at least one antenna (not shown). The controller circuit 628 and the at least one vehicle RKE circuit 640 may correspond to the controller circuit 428 and the vehicle RKE circuit 440 as previously described in connection with FIG. 4. The controller circuit 628 may control the receive circuit 610 based on input from at least one of the vehicle RKE circuit 640, the communication circuit 629 and the user interface 660. The communication circuit 629 may provide a communications link to a PTU 715 (as previously described in connection with FIGS. 5B and 5C and in connection with FIG. 7 below). The user interface 660 may be configured to provide feedback to a driver of the vehicle (e.g., the vehicle 401 as shown in FIG. 4) regarding a level of alignment or distance between the receive coil 618 and the transmit coil 714 of the PTU 715 (described in connection with FIG. 7 below).

The RKE circuit 640 may provide keyless entry functionality for the vehicle, as previously described in connection with FIG. 4. For example, the RKE circuit 640 may transmit a low frequency RKE signal for initiating and/or authenticating an RKE operation. The RKE circuit 640 may transmit the low frequency RKE signal in response to receiving input from a RKE key fob (e.g., the RKE key fob 450 of FIG. 4), from one or more PTU RKE circuits (e.g., the PTU RKE circuits 412 of FIG. 4 and/or as described in connection with FIG. 7 below) or from one or more sensors on the vehicle (not shown) indicating the initiation of an RKE operation.

In some implementations, the RKE circuit 640 may also transmit the LF RKE signal in response to detecting a wireless signal from a PTU RKE circuit located within an adjacent PTU (e.g., the PTU RKE circuit 442 in PTU 445 of FIG. 4). In yet other implementations, the RKE circuit 640 may transmit the LF RKE signal in response to detecting a wireless signal (e.g., a Bluetooth signal or a WiFi signal) from a personal wearable smart device (e.g., portable RF-enabled multimedia players, smart watches, etc. The vehicle RKE circuit 640 may lose RKE functionality due to saturation of the antenna within the RICE circuit 640 caused by the presence of the wireless field 605. Thus, as will be described in connection with FIG. 7 below, a PTU 715 (see FIG. 7) may receive the low frequency RKE signal and discontinue the transmission of wireless power from the PTU 715 and/or from at least one adjacent PTU (e.g., the PTU 445 of FIG. 4) in response.

As previously described in connection with FIGS. 4 and 5A-5E, the RKE circuit 640 may also be configured to receive an RF RKE signal including a position of the vehicle from at least one PTU RKE circuit within the PTU (see FIG. 7). The RKE circuit 640 may alternatively be configured to directly calculate the position of the vehicle based on the received RK RKE signal from the at least one PTU RKE circuit within the PTU. Utilizing the vehicle position, the user interface 660 may be configured to provide feedback to a driver of the vehicle regarding a level of alignment or distance between the receive coil 618 and a transmit coil of the PTU (see FIG. 7).

FIG. 7 is a functional block diagram of a wireless power transmit unit (PTU) 715, in accordance with an exemplary implementation. The PTU 715 may comprise a transmit circuit 706 electrically connected to a transmit coil 714, which may correspond to the transmit circuits 206/406 and transmit coils 214/414 of FIGS. 2 and 4, respectively. The transmit circuit 706 may include an oscillator 723 receiving a frequency control signal 723, a driver circuit 724 receiving an input voltage signal ($V_D$) 725 and a filter and matching circuit 726 connected to the transmit coil 714. Unless stated otherwise, each component within the transmit circuit 706 may correspond to, be interconnected as, and have substantially the same functionality as the respective component within the transmit circuit 206, as previously described in connection with FIG. 2.

The transmit circuit 706 may provide an AC current (e.g., a primary current) to the transmit coil 714. The transmit coil 714 produces the wireless field 605 based on the primary current. When substantially aligned with the transmit coil 714, the receive coil 718 may be located substantially within the wireless field 605. When the receive coil 618 (see FIG. 6) is located within the wireless field 605 the wireless field 605 induces an AC current (e.g., a secondary current) in the receive coil 618 (see FIG. 6).

The PTU 715 may further include a controller circuit 728 electrically connected to a communication circuit 729, to the transmit circuit 706 and to each of a plurality of PTU RKE circuits 712a, 712b, and 712c (hereinafter 712a-712c). The communication circuit 729 may be configured to communicate with the communication circuit 629 within the wireless power receiver system 600. The PTU RKE circuits 712a-712c may correspond to the PTU RKE circuits 412/512, as previously described in connection with FIGS. 4 and 5A-5E.

The PTU RKE circuits 712a-712c may receive the LF RKE signal transmitted from the vehicle RKE circuit 640, as previously described in connection with FIG. 6. Since the PTU RKE circuits 712a-712c may be continuously powered, power efficiency or conservation considerations imposed on RKE key fobs may not apply. Accordingly, the PTU RKE circuits 712a-712c may provide an increased range of RKE detection (e.g., 4-5 m) as compared to conventional RKE key fobs (e.g., 1-2 m). In response to receiving the LF RKE signal, one or more of the PTU RKE circuits 712a-712c may send a signal to the controller circuit 728 instructing the controller circuit 728 to shut down the transmit circuit 706. The transmit circuit 706 may then discontinue providing the primary current to the transmit coil 714, eliminating the wireless field 605. In some other implementations, one or more of the PTU RKE circuits 712a-712c may be configured to receive a signal from an RKE key fob (e.g., the RKE key fob 450 of FIG. 4). The PTU RKE circuits 712a-712c may then send the signal to the controller circuit 728 instructing the controller circuit 728 to shut down the transmit circuit 706. In some implementations, a wireless field (not shown) generated by one or more active adjacent PTUs (e.g., the PTU 445 of FIG. 4) may also interfere with the operation of (e.g., saturate the antenna(s) within) the vehicle RKE circuit 640 (see FIG. 6). In such cases, the controller circuit 728 may also send one or more control signals to the one or more active adjacent PTUs (e.g., the PTU 445 of FIG. 4) instructing associated transmit circuits (not shown) to shut down, thus eliminating the wireless fields (not shown) generated by the one or more active adjacent PTUs. In this way, operation of the antennas of the PTU RKE circuits 712a-712c and/or the antenna of the RKE key fob 450 may not be compromised by the wireless field 605 or a wireless field of an adjacent PTU (e.g., PTU 445 of FIG. 4).

As previously described in connection with FIGS. 4 and 5A-5E, as an additional functionality, the PTU RKE circuits 712a-712c may be configured to determine a position of the vehicle (e.g., the vehicle 401 of FIG. 4) based on the received LF RKE signal. The PTU RKE circuits 712a-712c may then transmit an indication of the position of the vehicle in the RF RKE signal. The PTU RKE circuits 712a-712c may alternatively be configured to transmit the RF RKE signal to the vehicle (e.g., the vehicle 401 of FIG. 4) in response to receiving a Bluetooth/WiFi signal from the vehicle 401.

Figure 8:
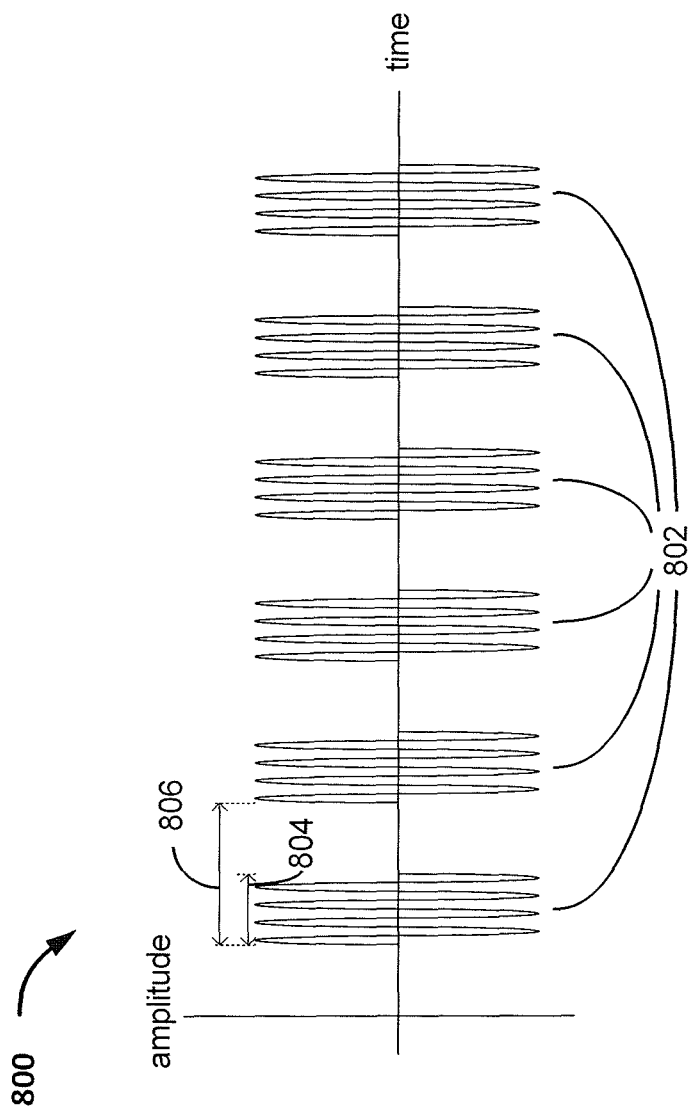
FIG. 8 is a graphic diagram illustrating a low frequency signal transmitted from a vehicle remote keyless entry circuit, in accordance with an exemplary implementation.

FIG. 8 is a graphic diagram illustrating a low frequency (LF) signal 800 transmitted from a vehicle remote keyless entry (RKE) circuit, in accordance with an exemplary implementation. As shown in FIG. 8, the graphic diagram depicts time on the horizontal axis and amplitude of the LF signal 800 on the vertical axis. The LF signal 800 may correspond to the LF RKE signal transmitted by the vehicle RKE circuit 440/540/640, as previously described in connection with FIGS. 4, 5A-5E and 6. The LF RKE signal 800 may comprise a plurality of frames or pulses 802. Each of the plurality of frames or pulses 802 has a predetermined duration 804 and may repeat with a repeat interval 806. For example, in some implementations, there may be six frames or pulses 802, each being transmitted at a carrier frequency of approximately 21 kHz, each having the repeat interval 806 of approximately 200 ms, and each having the predetermined duration 804. Accordingly, all six frames or pulses 802 may be transmitted by the vehicle RKE circuit 440/540/640 within 1.2 seconds (i.e., 6×200 ms). However, the above values are only exemplary. The LF signal 800 may have any carrier frequency, number of frames or pulses 802, duration 804 and repeat interval 806, depending on the particular implementation.

As previously described, the LF signal 800 may be utilized to initiate detection and/or authentication of a paired RKE key fob (e.g., key fob 450 of FIG. 4). In order for the vehicle RKE circuit 440/540/640 to provide RKE functionality, it is desirable that the paired RKE key fob 450 be able to receive and legibly process (e.g., accurately identify) at least one frame 802 of the LF signal 800. It is also desirable that the vehicle RKE circuit 440/540/640 be able to receive and legibly process (e.g., accurately identify) the radio frequency signal transmitted by the RKE key fob 450 in response to having received the LF signal 800. Accordingly, it is desirable that the wireless field 605 (FIGS. 6 and 7) not be present in proximity to either the vehicle RKE circuit 440/540/640 or the RKE key fob 450 for at least one frame or pulse 802 of the LF signal 800. Accordingly, it is desirable that the controller circuit 728 (FIG. 7) shut down the transmit circuit 706 in sufficient time for the RKE key fob 450 to receive at least one frame or pulse 802 of the LF signal 800. Thus, it is preferable that the controller circuit 728 shut down the transmit circuit 706 by the beginning of reception of the second frame or pulse 802 of the LF signal 800. In some implementations, this shutdown duration may correspond to a duration of substantially less than the repeat interval 806, e.g., less than 1 ms in some cases. Accordingly, with such a short shutdown duration, the RKE key fob 450 may be able to process even the first frame or pulse 802, depending on the particular authentication protocol. Even if the wireless field 605 is not completely eliminated during the first frame or pulse 802, the RKE key fob 450 may be able to receive and legibly process (e.g., accurately identify) at least the second frame or pulse 802 with the wireless field 605 eliminated. In this way, a user may enjoy full RKE circuit functionality in coexistence with wireless power transfer solutions.

Figure 9:
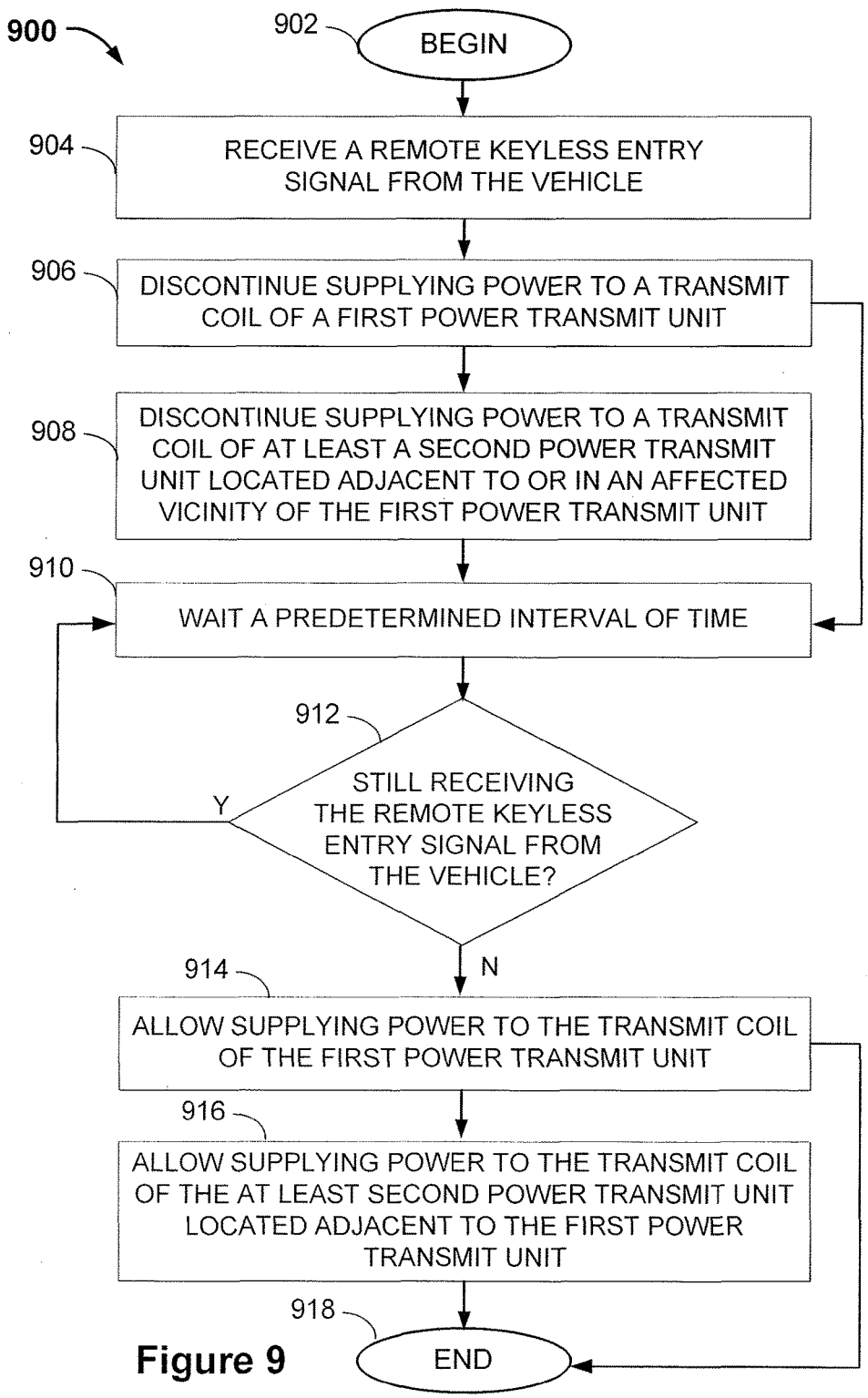
FIG. 9 illustrates a flowchart of a method of wireless charging, in accordance with an exemplary implementation.

FIG. 9 illustrates a flowchart 900 of a method of wireless charging, in accordance with an exemplary implementation. The method of flowchart 900 is described herein with reference to the wireless power transmit unit 415/715, as previously described in connection with FIGS. 4, 6 and 7. In an implementation, one or more of the blocks in flowchart 900 may be performed by a controller such as, for example, the controller circuit 728 of FIG. 7. Although the method of flowchart 900 is described herein with reference to a particular order, in various embodiments, blocks herein may be performed in a different order, or omitted, and additional blocks may be added. In some implementations, the flowchart 900 may apply when a vehicle (e.g., the vehicle 401 of FIG. 4) is located in a parking area. In some implementations, the method of flowchart 900 may be utilized when a user of the vehicle 401 touches a surface of the vehicle 401 (e.g., a door handle) to activate RKE functionality of the vehicle 401. At block 902, the method begins. At block 904, the method includes receiving a remote keyless entry signal from the vehicle. For example, in some implementations when the remote keyless entry activation signal is transmitted in block 904, the PTU RKE circuits 712a-712c may receive the LF RKE signal transmitted from the vehicle RKE circuit 640, as previously described in connection with FIGS. 6 and 7. The method may then advance to block 906.

At block 906, the method includes discontinuing supplying power to a transmit coil of a first power transmit unit. For example, the controller circuit 728 may direct the transmit circuit 706 to discontinue supplying power to the transmit coil 714 of the PTU 715. In some implementations, the controller circuit 728 may direct the transmit circuit 706 to reduce an amount of power supplied to the transmit coil 714 of the PTU 715, rather than completely discontinuing supplying the power. Block 906 may be carried out in response to receiving the LF RKE signal from the vehicle RKE circuit 640, as previously described in connection with FIGS. 6 and 7. In some implementations, the PTU 715 may correspond to the PTU 415 of FIG. 4, for example. The method may then advance to block 908.

At block 908, the method may include discontinuing supplying power to a transmit coil of at least one second power transmit unit located adjacent to or in an affected vicinity of the first power transmit unit. For example, the controller circuit 728 may direct a transmit circuit (not shown) of an adjacent PTU (e.g., the adjacent PTU 445 as shown in FIG. 4) to discontinue supplying power to a respective transmit coil (e.g., the transmit coil 444). In the alternative, the controller circuit 728 may direct the transmit circuit of the adjacent or nearby PTU 445 to reduce an amount of power supplied to the transmit coil 444 of the PTU 745, rather than completely discontinuing supplying the power. Like block 906, block 908 may be carried out in response to receiving the LF RKE signal from the vehicle RKE circuit 640, as previously described in connection with FIGS. 6 and 7. The method may then advance to block 910. Where block 908 is not carried out, the method may proceed from block 906 directly to block 910.

At block 910, the method may include waiting a predetermined interval of time. Block 910 may act as a delay period in which no further action is taken. In some implementations, the predetermined interval of time may be 3 s, 5 s, 10 s, or any other interval of time appropriate for the particular implementation. The method may then advance to block 912.

At block 912, the method may include determining whether any of the PTU RKE circuits 712a-712c are still receiving the LF RKE signal transmitted from the vehicle RKE circuit 640, as previously described in connection with FIGS. 6 and 7. A determination of "yes" may indicate that an RKE operation is still in progress and the transmit coils of the PTU(s) (e.g., the transmit coil 414 of PTU 415 and or the transmit coil 444 of the adjacent PTU 445 of FIG. 4) should remain unpowered. Accordingly, a determination of "yes" at block 912 may cause the method to proceed back to block 910. Contrarily, a determination of "no" at block 912 may cause the method to proceed to block 914.

At block 914, the method may include allowing the supply of power to the transmit coil of the first power transmit unit. For example, the controller circuit 728 may direct the transmit circuit 706 to resume or initiate transmitting power to the transmit coil 714, as previously described in connection with FIGS. 6 and 7. The first power transmit unit may also correspond to the PTU 415 of FIG. 4. If the controller circuit 728 reduced rather than completely discontinued the power supplied to the transmit coil 714 in block 906, the controller circuit 728 may direct the transmit circuit 706 to resume supplying the amount of power that was supplied to the transmit coil 714 prior to block 906 at block 914. If block 908 was not carried out, the method may advance directly to end block 918. If block 908 was carried out, the method may advance to block 916.

At block 916, the method may include supplying power to the transmit coil of the at least one second power transmit unit located adjacent to the first power transmit unit. For example, the controller circuit 728 may direct a transmit circuit (not shown) of an adjacent PTU (e.g., the adjacent PTU 445 as shown in FIG. 4) to resume or initiate supplying power to the respective transmit coil (e.g., the transmit coil 444). If the controller circuit 728 reduced rather than completely discontinued the power supplied to the transmit coil 444 of PTU 445 in block 908, the controller circuit 728 may direct the associated transmit circuit to resume supplying the amount of power that was supplied to the transmit coil 744 prior to block 908 at block 916. The method may then advance to end block 918.

Figure 10:
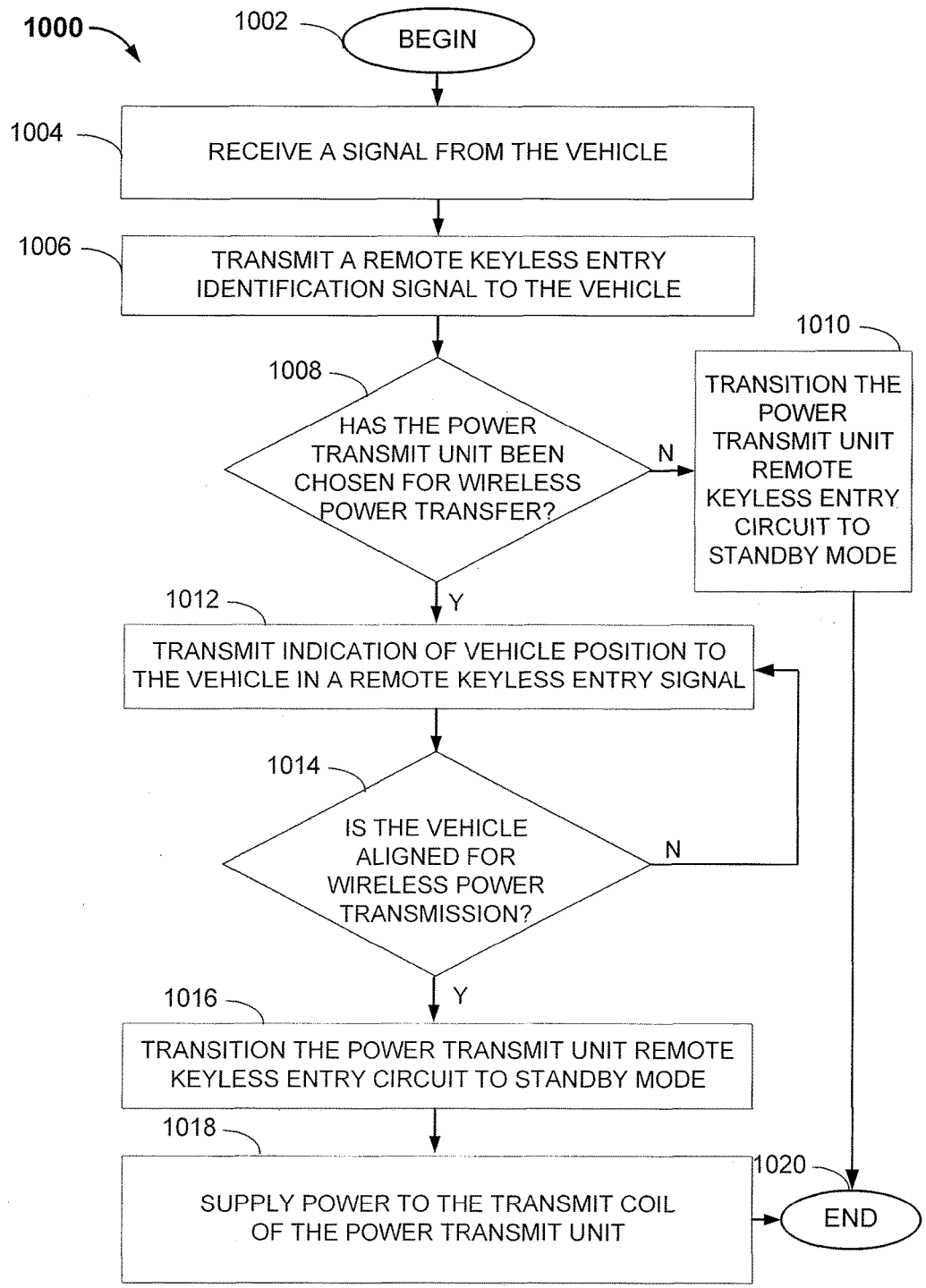
FIG. 10 illustrates a flowchart of a method of wireless charging, in accordance with another exemplary implementation.

FIG. 10 illustrates a flowchart 1000 of a method of wireless charging, in accordance with another exemplary implementation. The method of flowchart 1000 is described herein with reference to the wireless power transmit unit 415/715 (FIGS. 4, 6, and 7) and with reference to the alignment operation previously described in connection with FIGS. 5A-5E. In an implementation, one or more of the blocks in flowchart 1000 may be performed by a controller (e.g., the controller circuit 728 of FIG. 7). Although the method of flowchart 1000 is described herein with reference to a particular order, in various embodiments, blocks herein may be performed in a different order, or omitted, and additional blocks may be added. In some implementations, the flowchart 1000 may apply when a vehicle (e.g., the vehicle 401 of FIG. 4) has entered, is entering, or is located in a parking area and may be approaching one or more PTUs (e.g., PTUs 415 or 445 of FIG. 4).

At block 1002, the method begins. The method continues at block 1004 by receiving a signal from the vehicle. In some implementations, the signal may be the LF RKE signal, as previously described in connection with FIGS. 5A-5E, 6 and 7. In some other implementations, another wireless vehicle communication system (e.g., the communication circuit 629) may transmit a signal (e.g., a Bluetooth signal or a WiFi signal) instead of the LF RKE signal. Such a signal from the other wireless vehicle communication system 629 may be related to or associated with a pairing function (e.g., a Bluetooth or WiFi pairing) between, for example, the PTU 415 and the vehicle 401. Accordingly, the signal received in block 1004 may provide the unoccupied PTU (e.g., PTU 415/715 of FIGS. 4 and 7, respectively) with a mechanism for detecting the presence of the vehicle 401. The method may then advance to block 1006.

At block 1006, the method includes transmitting a remote keyless entry identification signal to the vehicle. For example, the controller circuit 728 may direct one or more of the PTU RKE circuits 712a-712c to transmit an RF RKE signal including an identification (ID) unique to the PTU 715. Likewise, a controller circuit (not shown) associated with one more other available PTUs (e.g., the PTU 445, with respect to the PTU 415 of FIG. 4) may direct one or more associated PTU RKE circuits (e.g., PTU RKE circuit 442) to transmit an RF RKE signal including an ID that is uniquely associated with the PTU 445. In this way, one or more available PTUs may announce their availability for wirelessly charging the vehicle (e.g., the vehicle 401 of FIG. 4). In some implementations, transmitting the RF RKE signal or sensing a transmission of the RF RKE signal may act as a trigger for turning off one or more PTUs that are already charging another vehicle in an affected vicinity of the PTU transmitting the RF RKE signal. The method may then advance to block 1008.

At block 1008, the method includes a determination as to whether the associated power transmit unit has been chosen for wireless power transfer. For example, as described in block 1006, more than one available PTU may announce its availability for charging the vehicle 401/501 of FIGS. 4 and 5. In response, the controller circuit 628 of the vehicle (e.g., the vehicle 401) may provide an indication of the available PTUs (e.g., one of the PTU 415 or the PTU 445 of FIG. 4) to the driver of the vehicle 401/501, via the user interface 660 of FIG. 6, for example. The driver may then select one of the available PTUs (e.g., one of the PTU 415 or the PTU 445 of FIG. 4) for subsequent wireless charging. The controller circuit 628 may then direct the vehicle RKE circuit 640 to transmit an indication of the selection. If the determination is "yes", the method may advance to block 1012. If the determination is "no", the method may advance to block 1010.

At block 1010, the method includes transitioning the power transmit unit remote keyless entry circuit to standby mode. For example, if the driver of the vehicle 401 does not select the PTU 415 (FIG. 4, corresponding to the PTU 715 of FIG. 7), the PTU RKE circuits 712a-712c may transition to a standby mode to conserve energy. The method may then advance to end block 1020.

At block 1012, the method includes transmitting an indication of the vehicle position to the vehicle in a remote keyless entry signal. For example, the driver of the vehicle 401 may select the PTU 415/515 (FIGS. 4/5, corresponding to the PTU 715 of FIG. 7) for alignment and subsequent wireless power transfer. In response, the controller 728 may direct one or more of the PTU RKE circuits 712a-712c to transmit an indication of the position of the vehicle 401/501 in an RF RKE signal to the vehicle 401/501, as previously described in connection with FIGS. 4-7. The driver of the vehicle 401 may utilize this information (which may be displayed on the user interface 660 of FIG. 6, for example) to align the vehicle 401/501 with the PTU 415/515/715. In implementations where the vehicle 401/501 directly calculates the vehicle position based on receiving the RF RKE signal in block 1006 (see FIGS. 5A-5E), the PTU RKE circuits 712a-712c may transmit the RF RKE signal without the indication of the position of the vehicle at block 1012. The method may then advance to block 1014.

At block 1014, the method may include a determination of whether the vehicle is aligned for wireless power transmission. For example, the controller circuit 728 may make such a determination utilizing any combination of inputs, including the determined position of the vehicle 401, an indication from a driver of the vehicle 401, etc. If the determination is "yes" the method may advance to block 1016. If the determination is "no" the method may advance back to block 1012, where the cycle between blocks 1012 and 1014 may repeat until the determination at block 1014 is "yes."

At block 1016, the method may include transitioning the power transmit unit remote keyless entry circuit to standby mode. For example, once the vehicle 401 is properly aligned with the PTU 415 (corresponding to the PTU 715 of FIG. 7) for wireless charging, the controller circuit 728 may direct the PTU RKE circuits 712a-712c to transition to a standby mode to conserve energy. The method may then advance to block 1018.

At block 1018, the method may include supplying power to the transmit coil of the power transmit unit. For example, the controller circuit 728 may direct the transmit circuit 706 to initiate transmitting power to the transmit coil 714, as previously described in connection with FIGS. 6 and 7. The power transmit unit 715 may also correspond to the PTU 415 of FIG. 4. The method may then advance to end block 1020.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations of the application.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features of the applications have been described herein. It is to be understood that not necessarily all such advantages may be achieved in accordance with any particular implementation of the application. Thus, concepts may be implemented or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for transmitting charging power wirelessly to a vehicle, the apparatus comprising:
   a transmit circuit configured to transfer wireless charging power to the vehicle via a wireless field; and
   a controller configured to detect transmission of a wireless vehicle signal having a transmission period and indicative of operation of a vehicle communication system, and further configured to cause the transmit circuit to reduce a level of charging power within a first portion of the transmission period, wherein a second, remaining portion of the transmission period is of sufficient duration for allowing identification of the wireless vehicle signal by a receiver of the wireless vehicle signal.

2. The apparatus of claim 1, wherein the wireless vehicle signal is a keyless entry signal and comprises a plurality of pulses, and wherein at least one of the plurality of pulses is transmitted within the first portion of the transmission period and the remaining pulses are transmitted within the second, remaining portion of the transmission period of the wireless vehicle signal.

3. The apparatus of claim 1, wherein the second, remaining portion of the transmission period is of sufficient duration if the receiver is not saturated by the wireless field or if the wireless field is substantially eliminated when the receiver receives at least one pulse of the wireless vehicle signal and responds according to a predetermined communication protocol.

4. The apparatus of claim 1, wherein the transmit circuit comprises a transmit antenna circuit and a driver circuit configured to provide a drive current to the transmit antenna circuit for generating the wireless field.

5. The apparatus of claim 1, wherein the controller is configured to cause the transmit circuit to discontinue providing the wireless charging power within the first portion of the transmission period.

6. The apparatus of claim 1, wherein the controller is further configured to cause another transmit circuit, within the first portion of the transmission period, to reduce or stop providing a level of wireless charging power to another vehicle in response to detecting the transmission of the wireless vehicle signal.

7. The apparatus of claim 6, wherein the controller is further configured to:
   cause the another transmit circuit to maintain the reduced or eliminated level of charging power for a predetermined interval of time;
   determine whether the wireless vehicle signal is detected after the predetermined interval of time; and cause the another transmit circuit to increase the level of charging power if the wireless vehicle signal is not detected after the predetermined interval of time.

8. The apparatus of claim 1, further comprising a wireless communication circuit configured to receive the wireless vehicle signal and communicate detection of the wireless vehicle signal to the controller.

9. The apparatus of claim 8, wherein the transmit circuit and the wireless communication circuit are configured to be housed in a common assembly.

10. The apparatus of claim 1, wherein the controller is further configured to:
cause the transmit circuit to maintain the reduced level of charging power for a predetermined interval of time;
determine whether the wireless vehicle signal is detected after the predetermined interval of time; and
cause the transmit circuit to increase the level of charging power if the wireless vehicle signal is not detected after the predetermined interval of time.

11. The apparatus of claim 1, wherein the controller is configured to generate a signal for directing and aligning the vehicle over a transmit antenna circuit of the transmit circuit in response to detecting transmission of the wireless vehicle signal.

12. A method for transmitting charging power wirelessly from a transmit circuit to a vehicle, the method comprising:
transferring a level of charging power to the vehicle via a wireless field;
detecting transmission of a wireless vehicle signal having a transmission period and indicative of operation of a vehicle communication system; and
reducing the level of charging power within a first portion of the transmission period, wherein a second, remaining portion of the transmission period is of sufficient duration for allowing identification of the wireless vehicle signal by a receiver of the wireless vehicle signal.

13. The method of claim 12, wherein the wireless vehicle signal is a keyless entry signal and comprises a plurality of pulses, and wherein at least one of the plurality of pulses is transmitted within the first portion of the transmission period and the remaining pulses are transmitted within the second, remaining portion of the transmission period of the wireless vehicle signal.

14. The method of claim 12, wherein the second, remaining portion of the transmission period is of sufficient duration if the receiver is not saturated by the wireless field or if the wireless field is substantially eliminated when the receiver receives at least one pulse of the wireless vehicle signal and responds according to a predetermined communication protocol.

15. The method of claim 12, further comprising discontinuing providing the wireless charging power within the first portion of the transmission period.

16. The method of claim 12, further comprising reducing or discontinuing a level of wireless charging power transferred from another transmit circuit to another vehicle within the first portion of the transmission period in response to detecting the transmission of the wireless vehicle signal.

17. The method of claim 12, further comprising: maintaining the reduced level of charging power for a predetermined interval of time; determining whether the wireless vehicle signal is detected after the predetermined interval of time; and increasing the level of charging power if the wireless vehicle signal is not detected after the predetermined interval of time.

18. The method of claim 15, further comprising:
causing the another transmit circuit to maintain the reduced or eliminated level of charging power for a predetermined interval of time;
determining whether the wireless vehicle signal is detected after the predetermined interval of time; and
causing the another transmit circuit to increase the level of charging power if the wireless vehicle signal is not detected after the predetermined interval of time.

19. The method of claim 12, further comprising generating a signal for directing and aligning the vehicle over a transmit antenna circuit of the transmit circuit in response to detecting transmission of the wireless vehicle signal.

20. A non-transitory computer-readable medium comprising code that, when executed, causes an apparatus for transmitting charging power wirelessly to:
transfer a level of charging power to a vehicle via a wireless field;
detect transmission of a wireless vehicle signal having a transmission period and indicative of operation of a vehicle communication system; and
reduce the level of charging power within a first portion of the transmission period, wherein a second, remaining portion of the transmission period is of sufficient duration for allowing identification of the wireless vehicle signal by a receiver of the wireless vehicle signal.

21. The non-transitory computer-readable medium of claim 20, wherein the wireless vehicle signal is a keyless entry signal and comprises a plurality of pulses, and wherein at least one of the plurality of pulses is transmitted within the first portion of the transmission period and the remaining pulses are transmitted within the second, remaining portion of the transmission period of the wireless vehicle signal.

22. The non-transitory computer-readable medium of claim 20, wherein the second, remaining portion of the transmission period is of sufficient duration if the receiver is not saturated by the wireless field or if the wireless field is substantially eliminated when the receiver receives at least one pulse of the wireless vehicle signal and responds according to a predetermined communication protocol.

23. The non-transitory computer-readable medium of claim 20, wherein the code, when executed, further causes the apparatus to discontinue providing the wireless charging power within the first portion of the transmission period.

24. The non-transitory computer-readable medium of claim 20, wherein the code, when executed, further causes the apparatus to reduce or discontinue a level of wireless charging power transferred from another transmit circuit to another vehicle within the first portion of the transmission period in response to detecting the transmission of the wireless vehicle signal.

25. The non-transitory computer-readable medium of claim 20, wherein the code, when executed, further causes the apparatus to: maintain the reduced level of charging power for a predetermined interval of time; determine whether the wireless vehicle signal is detected after the predetermined interval of time; and increase the level of charging power if the wireless vehicle signal is not detected after the predetermined interval of time.

26. The non-transitory computer-readable medium of claim 23, wherein the code, when executed, further causes the apparatus to:
cause the another transmit circuit to maintain the reduced or eliminated level of charging power for a predetermined interval of time;
determine whether the wireless vehicle signal is detected after the predetermined interval of time; and cause the another transmit circuit to increase the level of charging power if the wireless vehicle signal is not detected after the predetermined interval of time.

27. The non-transitory computer-readable medium of claim 20, wherein the code, when executed, further causes the apparatus to generate a signal for directing and aligning the vehicle over a transmit antenna circuit of the transmit circuit in response to detecting transmission of the wireless vehicle signal.

28. An apparatus for transmitting charging power wirelessly to a vehicle, the apparatus comprising:
   means for transferring wireless charging power to the vehicle via a wireless field;
   means for detecting transmission of a wireless vehicle signal having a transmission period and indicative of operation of a vehicle communication system; and
   means for causing the transferring means to reduce a level of charging power within a first portion of the transmission period, wherein a second, remaining portion of the transmission period is of sufficient duration for allowing identification of the wireless vehicle signal by a receiver of the wireless vehicle signal.

29. The apparatus of claim 28, wherein the wireless vehicle signal is a keyless entry signal and comprises a plurality of pulses, and wherein at least one of the plurality of pulses is transmitted within the first portion of the transmission period and the remaining pulses are transmitted within the second, remaining portion of the transmission period of the wireless vehicle signal.

30. The apparatus of claim 28, further comprising means for reducing or discontinuing transferring a level of wireless charging power to another vehicle within the first portion of the transmission period in response to detecting the transmission of the wireless vehicle signal.

* * * * *